United States Patent [19]

Briotet

[11] 4,245,470
[45] Jan. 20, 1981

[54] DEVICE TO CONTROL A JET ENGINE

[75] Inventor: Jean P. F. G. Briotet, Le Mee, France

[73] Assignee: Societe Nationale d'Etude et de Construction de Moteurs d'Aviation, Paris, France

[21] Appl. No.: 943,378

[22] Filed: Sep. 18, 1978

[30] Foreign Application Priority Data

Sep. 23, 1977 [FR] France .................... 77 29239

[51] Int. Cl.³ .......................... F02K 3/08; F02C 9/06
[52] U.S. Cl. .................................................. 60/243
[58] Field of Search .................. 60/39.28 R, 243; 417/219, 213, 390

[56] References Cited

U.S. PATENT DOCUMENTS

| 2,649,906 | 8/1953 | Neal et al. | 60/39.28 R |
| 2,686,561 | 8/1954 | Isreeli et al. | 60/39.28 R |
| 2,932,946 | 4/1960 | Smedley | 60/39.28 R |
| 2,936,028 | 5/1960 | Gatzemeyer | 60/39.28 R |
| 3,022,738 | 2/1962 | Krute | 417/390 |
| 3,023,575 | 3/1962 | Haase et al. | 60/39.28 R |
| 3,067,693 | 12/1962 | Lambeck | 417/219 |
| 3,183,957 | 5/1965 | Cowles et al. | 60/39.28 R |
| 3,669,572 | 6/1972 | King | 417/390 |

Primary Examiner—Robert E. Garrett
Attorney, Agent, or Firm—Bacon & Thomas

[57] ABSTRACT

A hydraulic pump combined with a pressure regulator driven by a low pressure shaft of the jet engine, supplies a hydraulic fluid at a constant pressure into a feed conduit of a volumetric hydraulic motor coupled with a volumetric pump, which supplies fuel to the injectors of the combustion chamber of the jet engine.

5 Claims, 1 Drawing Figure

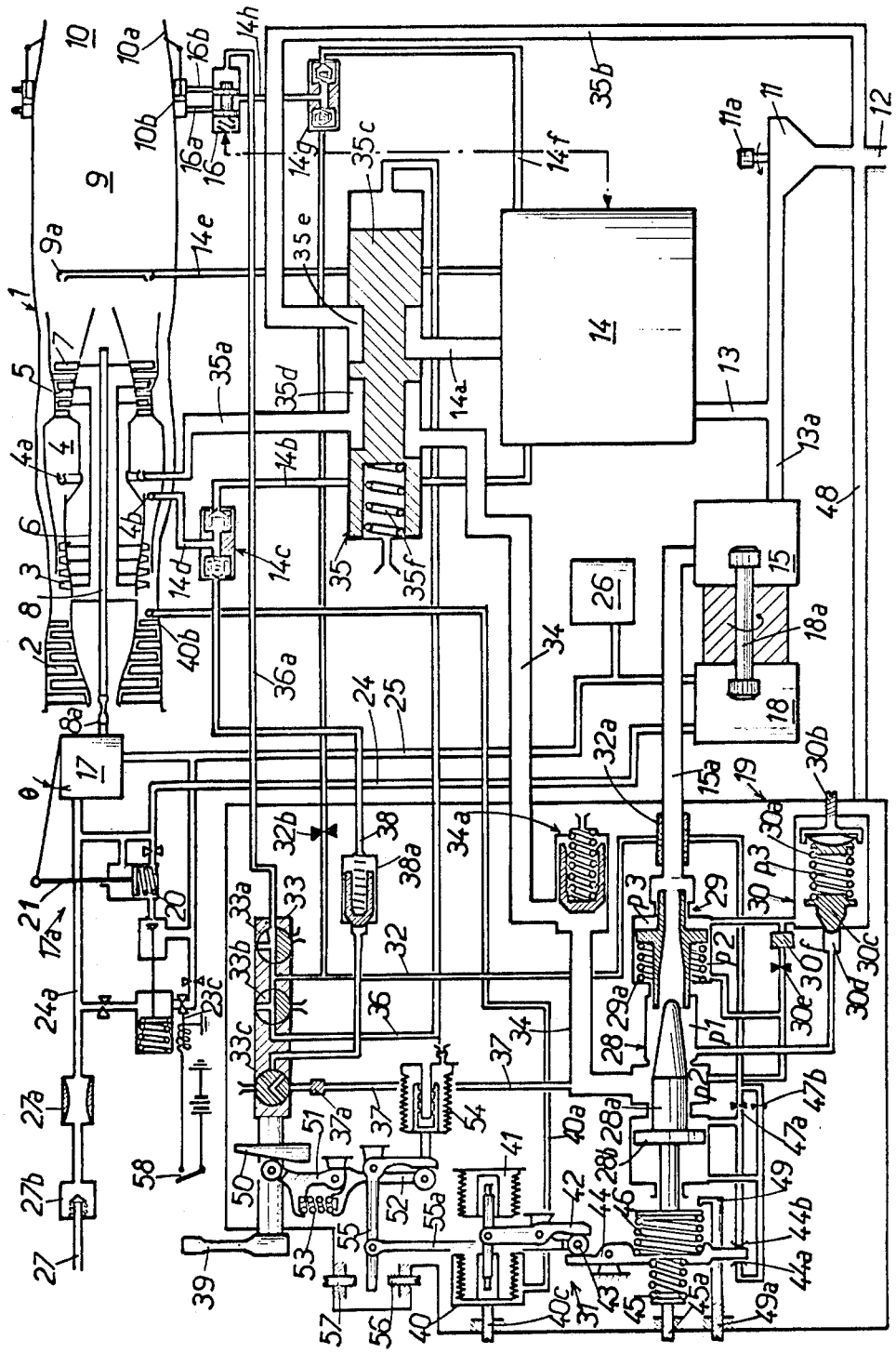

DEVICE TO CONTROL A JET ENGINE

BACKGROUND OF THE INVENTION

The invention concerns, in a general manner the control of aircraft jet engines and more specifically a particularly simple control device especially applicable to emergency control.

The conventional control of an aircraft jet engine comprises essentially a fuel pump powered by the engine and supplying a flow regulator, which is controlled as a function of various parameters so as to control the fuel flow to the passage section as necessary to supply the combustion chamber of the jet engine with a suitable flow of the fuel. Because the regulator is usually supplied at a variable pressure, accurate flow control may generally be obtained only by combining the regulator with a control valve which maintains the pressure across the regulator at a constant value, by means of regulating a by-pass flow at the inlet of said regulator. In advanced jet engines, controls must also regulate the cross section of the propulsive nozzle and the flow of afterburner fuel (if such is provided); certain parts of equipment additionally assure the supply of hydraulic power for the service appliances on the aircraft upon which the jet engine is mounted.

Such controls are highly complex. When jet engines comprise such controls, and particularly when the aircraft is equipped with a single jet engine, it is essential to provide the capability of overcoming possible control failures. Direct mechanical control of the flow regulator may be contemplated, in the manner of a control lever. However, such a direct regulator does not remedy, particularly, a rupture of the kinematic chain driving the fuel pump. It is thus desirable to provide complete emergency controls.

SUMMARY OF THE INVENTION

It is a principal object of the present invention to provide simplified controls which still assure the correct functioning of the jet engine with an adequate performance.

It is also an object of the invention to provide controls which do not comprise regulating valves and which still insure accurate fuel flow control.

Another object of the invention is to provide emergency controls which are completely independent of the principal controls.

The control device according to the invention comprises a self-controlled pump (i.e., a pump equipped with a regulator which varies the flow of the pump so as to maintain its charging pressure at a constant value), driven by the jet engine and charging a hydraulic liquid into a volumetric hydraulic motor, said hydraulic motor driving a volumetric fuel pump supplying the injectors of the combustion chamber by means of a flow regulator. The self-regulating pump may consist, for example, of a pump of a known type, comprising a rotating cylinder equipped, parallel to its axis, with a ring of bores in which the pistons move, said pistons being actuated by an inclined platform or swash plate, associated with a control activated by the charging pressure, to vary the inclination of said platform. It may also consist of a pump of the "Hale-Shaw" type with radial cylinders, having pistons supported by an eccentric cylindrical surface connected with a control which is activated by the charging pressure to vary the eccentricity.

The charging pressure of the self-regulating pump is thus maintained constant, in spite of the variations of the rotating velocity of the pump (which is driven by the jet engine) and the flow rate of the hydraulic liquid applied by the hydraulic motor. The result is that the charging pressure of the fuel pump is also maintained constant. The flow of the volumetric fuel pump is in effect proportional to the flow of the liquid activating the volumetric hydraulic motor, the ratio of the flows being equal to the ratio of the cylinders of the two devices and because their power output (equal in each case to the product of the flow and the pressure) is also equal, the fuel pressure is proportional to the pressure with approximate variations. Consequently, the fuel flow regulator is supplied at a constant pressure and is thus able to provide the desired fuel flow with precision without the need for a control valve.

BRIEF DESCRIPTION OF THE DRAWING

The description which follows hereafter, in regard to the drawing attached hereto, is presented in the nature of a nonlimiting example and furnishes a better understanding of the advantages of the invention and its mode of embodiment; all of the peculiarities which appear either in the drawing or in the text being within the scope of the invention.

The single FIGURE is a diagrammatic representation of the controls of an aircraft jet engine comprising, as an emergency measure, a device according to the invention.

DESCRIPTION OF A PREFERRED EMBODIMENT

The drawing shows a jet engine 1, mounted aboard an aircraft, not shown, and comprising a high pressure compressor 3, fed by a low pressure compressor 2, which charges air into a combustion chamber 4, equipped with a fuel injection manifold 4a and with ignition injectors 4b. The fuel burned in the combustion chamber 4 in the flow of air charged by the compressor, forms a flow of hot gases which passes successively into a high pressure turbine 5, drivingly coupled to the high pressure compressor 3 by means of a hollow shaft 6, then into a low pressure turbine 7 with a shaft 8 and then into an afterburner channel 9 equipped with an afterburner fuel injection manifold 9a and ending in a jet nozzle 10, the outlet section of which is controlled by flaps 10a regulated by a ring of hydraulic jacks 10b.

A centrifugal pump 11, called the feeder pump, has a shaft 11a which is connected with the jet engine 1 by means of a transmission, not shown, so as to be driven in rotation by said jet engine, and draws fuel by means of the tubing 12 into a reservoir, not shown, and feeds fuel into two conduits 13, 13a, which open respectively into a principal control device designated in its entirety by the reference 14, and into an emergency fuel pump 15, which will be described later. The principal control device 14 is of the conventional type, it is connected with the jet engine 1 and the fuselage, not shown, of the aircraft by kinematic chains, not shown, which drive a principal fuel pump, not shown, and communicate the control parameters to the device 14. The fuel, which is placed under pressure and suitably regulated in the device 14, exits from said device through a conduit 14a, which may be linked with the injection manifold 4a by means to be described later. Means are provided in the device 14 to supply ignition fuel to a conduit 14b, leading to a valve chamber 14c, connected by means of a conduit 14d to the ignition injectors 4b, to supply afterburner fuel as needed to a conduit 14e leading to the afterburner injection manifold 9a and to provide fuel under pressure to a conduit 14f opening into a valve chamber 14g, connected by means of a conduit 14h with a distributor 16. The distributor 16 is linked by means of the conduits 16a, 16b with the jacks 10b of the nozzle 10. Means, not shown, are also provided in the principal controls to regulate the distributor 16 so as to adjust the outlet of the nozzle 10 to the flight conditions of the aircraft.

The emergency control device comprises essentially a hydraulic pump 17 coupled with the shaft 8 of the jet engine and driving a hydraulic motor 18, which in turn is coupled with the emergency fuel pump 15, said emergency pump charging the fuel coming from the piping 13a into a conduit 15a leading into an emergency control box 19, which contains all the apparatus necessary to assure a simplified control of the jet engine 1 in case of a failure of the principal controls; said apparatus to be described later herein.

The hydraulic pump 17 is of the rotating cylinder and inclined platform or swash plate type mentioned in the introduction of the present description and is coupled with the shaft 8 by means of a torque limiter 8a consisting of a rod dimensioned so as to break in case a predetermined torque is exceeded. The pump 17 is self-regulating, being associated with a regulator designated in its entirety by the reference 17a, which varies the flow from said pump by regulating the inclination of the platform (not shown) which actuates the piston rods, not shown, of the pump, in a manner so as to maintain the fuel pressure at a constant value.

The regulating device 17a is represented diagrammatically by a piston 20, the rod 21 of which controls the inclination of the platform. An electro valve 23c controlled by a switch 58, determines the magnitude of the feed pressure of the pump 17. When the electro valve is not activated or open, the feed pressure of the pump 17 is maintained at 210 bars. When the electro valve is activated, i.e., closed, the feed pressure of the pump 17 is maintained at a lower level, 110 bars for example.

The charging conduit 24 of the pump 17 is connected with the inlet of the hydraulic motor 18 and the suction conduit 25 is connected with a reservoir 26 of hydraulic liquid, to which the outlet of the hydraulic motor is also connected. The hydraulic motor 18 is a volumetric motor, for example, with pistons and constant cylinder capacity, and it drives by means of the rigid coupling 18a to the emergency fuel pump 15, which is also volumetric, for example, with vanes or gears, so that the pressure of the fuel charged into the conduit 15a by the pump 15 is proportional to the pressure of the hydraulic liquid in the conduit 24, as has been explained hereinabove. A branch 24a of the supply conduit 24 is connected by means of a flow limiter 27a and a check valve 27b with the inlet 27 of a supply circuit for the service appliances of the aircraft (not shown).

The emergency control devices contained in the box 19 comprise a flow regulator 28 which receives fuel from the conduit 15a by means of a throttle valve 29 associated with a density corrector 30, the flow regulator comprising a control spindle 28a integral with a piston 28b, stressed on both of its faces by pressures modulated by a control device designated in its entirety by the reference numeral 31. As has been explained hereinabove, the emergency fuel pump 15 supplies fuel at a constant pressure to the conduit 15a, so that corrections by means of a control valve for the fuel flow supplied by the regulator spindle 28a, may be dispensed with. In the mode of embodiment presented, it is nevertheless preferred to insure the regulation of the fuel pressure drop when traversing the flow regulator 28, by means of a control valve consisting of the throttle 29 associated with the density corrector 30, particularly to account for possible variations in pressure due to the aging of the hydraulic pump 17. The device 29 acts by regulating, by means of a weak and constant pressure differential, a throttle mounted in cascade with the flow regulator, upstream from said flow regulator. As seen in the drawing, the throttle valve 29 is placed under pressure in the opening direction by the pressure, at p2, of the fuel at the outlet of the regulator 28, assisted by a spring 29a, and in the closing direction by the pressure, at p3, of the fuel exiting from the density corrector 30. The pressure at p3 is determined by the force of a spring 30a (adjustable by means of a screw 30b), which acts upon a cut-off 30c in a direction to close a nozzle 30d fed by the inlet pressure p1 of the regulator 28, in order to control a bypass flow toward the outlet of said regulator through the throttle 30e, protected by a filter 30f. Because the cut-off 30c is acted upon in the opening direction by the pressure p1, the p1-p3 pressure drop is determined by the force of the spring 30a, the spring maintaining said pressure drop at a constant value (which may be modified in keeping with the density of the fuel by means of the adjusting screw 30b). The difference between the pressures p3 and p2 is maintained constant by the force of the spring 29a. The result is that the pressure drop p1-p2 is also maintained constant.

A conduit 32 takes fuel from the conduit 15a through a filter 32a and supplies filtered fuel on the one hand to two cocks 33a, 33b of an assembly of three-way cocks 33 at the option of the aircraft pilot, and on the other hand, through the throttle 32b, to the supply valve box 14g of the distributor 16 of the jacks of the nozzle. The outlet of the cock 33a is connected by a conduit 36a to the nozzle distributor 16. The fuel dispensed by the spindle 28a is conducted by means of the conduit 34 through an overpressure valve 34a to a slide valve 35, into which the outlet conduit 14a of the principal control 14 also opens, and which in turn is connected with the injector bank 4a by means of a conduit 35a and to the suction of the feed pump 11 by means of a conduit 35b. The slide 35c of spool valve 35 is equipped with two annular chambers 35d, 35e and is urged toward the right of the drawing by a spring 35f; the right end of the device is connected with the outlet of the cock 33b by means of a conduit 36 and when said conduit is under pressure (position shown), the slide 35c is urged toward the left, in which position the annular chamber 35d connects the conduits 34 and 35a and the annular chamber 35e connects the conduit 14a with the return conduit 35b. When the conduit 36 is not under pressure, the spring 35f urges the slide 35c toward the right, in which position the annular chamber 35d connects the conduits 14a and 35a and the slide 35c blocks the conduit 34. A conduit 37 takes fuel from the conduit 34 and supplies through a filter 37a a third cock 33c, the outlet of which is connected with a conduit 38, by means of a non-return ignition valve 38a, the valve box 14c which in turn supplies the ignition injectors 4b.

As may be seen in the drawing, each of the valve boxes 14c and 14g, which are connected with a conduit of the normal control and a conduit of the emergency control, contains a pair of check valves acted upon by a spring, said check valves automatically closing the one of the two conduits without pressure in favor of the conduit under pressure.

The control device 31 is of a type capable of regulating the measuring spindle 28a so that the fuel flow C supplied to the injector bank 4a by the conduit 34 is controlled as a function of α and of Ps3, α being the angle of a control lever and Ps3 the outlet pressure of the low pressure compressor 2. The emergency control lever 39 is separate from the control lever (not shown) of the principal control and a blocking device (not shown) is provided for the pilot to block the one of the two levers not in use.

The parameter Ps3 is introduced into the regulation by means of a pair of capsules 40, 41. The capsule 40 is supplied with air at a pressure Ps3 by a conduit 40a connected with a pick-up 40b located at the outlet of the low pressure compressor 2, and the capsule 41 is exposed to vacuum. An adjusting screw 40c is provided to balance the force exerted by the pair of capsules.

The pair of capsules 40, 41 activates a lever 42, which transmits by means of a roller 43 the force of the capsules to a lever 44 serving to calculate the ratio of CPs3, said lever being exposed additionally to the force of a levelling spring 45, regulated by means of a screw 45a, the force of a spring 46 which measures the position of the dispensing spindle 28a and to the force of the hydraulic return applied to the end of said lever 44 by virtue of its cooperation with the two nozzles 44a, 44b to modulate the pressures on opposite sides of the piston 28b of the dispensing spindle. This arrangement is known as a "force balance"; for a given position of the roller 43, when the force of the capsules is not balanced by the force of the spring 46, the lever 44 turns and varies the ejection sections of the two nozzles 44a, 44b, supplied by means of the throttles 47a, 47b with filtered fuel, taken at 32 and flowing into the box 19, which is connected by means of a drain 48 with the suction of the pump 11.

The variation of the ejection sections of the two nozzles 44a, 44b modifies the pressures acting on either side of the piston 28b, so that the dispensing spindle 28a assumes a new equilibrium position. A stop 49, controlled by a screw 49a, determines the minimum value of the fuel flow C. The parameter α is introduced into the regulation by the lever 39. Said lever controls the displacement of the cam 50 which in turn controls the movements of the roller 43 by means of a lever articulated in two parts 51, 52 maintained in a spaced apart relationship by a spring 53, a shock absorber 54 and a lever 55 which transmits by means of a connecting rod 55a the displacement of the shock absorber to the roller 43. Said roller 43 makes it possible to assign a desired value to the ratio of C/Ps3, which is determined by the lever angle α. The shock absorber 54 consists of a bellows which is compressed when speed is reduced and which expands—in order to move the lever 55 and the roller 43 toward the "full gas" position by being inflated through small diameter apertures. The spring 53 serves to limit the force transmitted to the shock absorber 54 when the lever 39 is moved from "full gas" toward reduced speed. If the control lever is moved in the opposite direction, contact is broken between the lever 51–52 located between the cam and the shock absorber, because said lever is not long enough. The rotation of the lever 55 is limited by two adjustable stops 56, 57, which define, respectively, the minimum and maximum values of the ratio of C/Ps3.

The cock assembly 33 is controlled by the control handle or lever 39 and the pilot has available a switch 58 which controls the opening and closing of the electro valve 23c.

The jet engine 1 is normally controlled by means of the principal controls. The electro valve 23c is closed so that the hydraulic pump 17 charges at the reduced pressure of 110 bars, that the hydraulic motor 18 drives the pump 15 at a reduced speed and the latter feeds the fuel to the conduit 15a at a pressure just sufficient to compensate for the leaks of the emergency control at rest; the valve 27b is closed and the service appliances of the aircraft (not shown) are supplied with hydraulic liquid by the principal control. Because the pressure is lower in the conduit 32 than in the conduit 14f, the valves of the valve box 14g assume a position so that the conduit 14h is supplied by the conduit 14f and the distributor 16 is regulated by means, not shown, provided within the principal controls. The cock bodies 33b, 33c assume a position so that their outlets conduits communicate with the interior of the box 19 and are thus exposed to the suction pressure of the feed pump 11, the outlet of the cock 33a is closed and does not interfere with the functioning of the distributor 16. The slide 35c is held by spring 35f in its right hand position, in which the conduit 35a (supplying the injection manifold 4a) is connected with the conduit 14a of the principal controls and the valve box 14c closes the conduit 38 and opens the conduit 14d (connected with the ignition injectors 4b) to communicate with the conduit 14b. In case of a failure of the principal controls, the pilot activates the switch 58 to open the electro valve 23c, thus placing the platform of the hydraulic pump 17 in an inclined position so that the pump feeds hydraulic liquid at a constant pressure of 210 bars; the hydraulic motor 18 then drives the pump 15 at a velocity so that the emergency fuel pressure in the conduits 15a, 32, 34 and 37 rises to its operating value; the position of the valves of the box 14g is reversed, so that the conduit 15h is supplied by the conduit 32. In addition, the pressure in the branch 24a opens the check valve 27b so that the service appliances of the aircraft may be supplied with hydraulic liquid by the pump 17. The pilot simultaneously activates a device (not shown) to block the principal control lever and to release the control lever 39 and places the latter in a reignition position (if the jet engine is flamed out) or directly in the flight position. In the reigniting position, the cock 33a places the conduit 36a in communication with the interior of the casing 19, so that the distributor 16 (which is no longer regulated by the principal control, the latter having failed) is urged by its spring toward the right of the drawing and that the pressure of the conduit 14h passes into the conduit 16h, keeping the flaps of the nozzle 10a in the open position. The cock 33b is in a position so that the fuel under pressure passes from the conduit 32 into the conduit 36 and urges the slide 35c to the left, i.e., into the position shown, in which the chamber 35d is in communication with the conduits 34 and 35a, thus supplying the principal injection manifold 4a with fuel dispensed by the emergency control. The cock 33c places the conduits 37 and 38 into communication with each other, so that the pressurized fuel of the conduit 37 passes into the conduit 38, repels the corresponding valve of the valve box 14c and arrives at ignition injectors 4b. An ignition device (not shown) may then be activated to ignite the fuel atomized by the injectors 4b, which in turn ignites the fuel atomized by the principal injection of manifold 4a. The control lever 39 may then be placed in the flight position. In said flight position, the three cock are in the position shown. The pressurized liquid passes from the conduit 32 into the conduit 36a and urges the distributor into the position shown, so that the pressure of the conduit 14h passes to the conduit 16a and keeps the nozzle in its closed position. The conduit 38 is blocked so that the ignition injectors 4b are not supplied. The slide 35c remains in its position shown, so that combustion in the chamber 4 is supplied by fuel dispensed by the spindle 28a, the pilot having the capacity of assigning different values to the ratio of C/Ps3 by means of the control lever, in order to control the operation of the jet engine. If the pilot raises the value assigned to the ratio of C/Ps3, this is translated into a displacement of the roller 43 toward the top of the drawing and thus a decrease of the force exerted by the capsules 40-41 on the lever 44, the latter will then rotate in the clockwise direction. This results in an increase in the escape section of the nozzle 44b and a decrease in the escape section of the nozzle of the escape section of the nozzle 44a and consequently in an unbalance of the pressures acting on either side of the piston 28b, said unbalance will then move the spindle 28a to the left, until the resultant increase in the force applied by the spring 46 on the lever 44 moves said lever into its median position. The fuel flow dispensed by the spindle 28a will then increase and this will reduce the fuel pressure in the conduit 15a. Because this pressure, as has been explained hereinabove, is necessarily proportional to the pressure of the hydraulic liquid in the conduit 24, the hydraulic motor 18 will tend to accelerate so that the pump 15 may reestablish the proportionality of the two pressures. The acceleration of the hydraulic motor 18, supplementing the flow of the hydraulic liquid, leads to the activation of the regulator 17a, which will maintain at 210 bars the pressure of the hydraulic liquid in the conduit 24, so that the fuel pressure in the conduit 15a will remain at its original value. The emergency control device described in the foregoing makes it possible to attain the objectives defined in the introduction and additionally offers the following advantages:

the volumetric pump 15 is driven at a variable velocity which eliminates the need of returning a portion of the fuel by suction; the latter unnecessarily heats the fuel and leads to accelerated wear of the pump. Said pump supplies fuel at the exact rate at which it is consumed by the engine and no more;

the hydraulic motor 18 is a pump with a constant cylinder capacity; it is driven by the hydraulic liquid provided by the self-regulating pump 17. A hydraulic liquid of a much higher viscosity than the fuel may be used without encountering harmful chemical reactions of the hot fuel with copper or silver parts. The reliability of the entirety of the hydraulic pump and liquid is thus enhanced. Further, a leak of the hydraulic liquid at the level of the pump 17, located in the nose of the jet engine and driven in rotation by said engine, does not present the degree of danger as if said pump would be operating with fuel;

the fuel pump 15 is not driven—as in the conventional modes of embodiment—by a mechanical kinematic chain and thus cannot be immobilized by the failure of such a chain;

it is possible to modify the pressurizing of the fuel by the pump 15. It is possible to start or stop the hydraulic pump 17 by operating a simple electrical interrupter and to stop the fuel pump 15 or let it rotate slowly, which reduces wear. Wear is also reduced on the hydraulic pump 17 by diminishing its charging pressure;

the hydraulic fluid which drives the emergency fuel pump, also insures the supply of hydraulic liquid to the service appliances of the aircraft; this leads to the elimination of a kinematic chain without an increase in the number of pumps.

It should be obvious that the embodiment described herein above is only an example and that it may be modified, in particular by substituting equivalent techniques, without exceeding the scope of the invention. Those skilled in the art will readily understand how it is possible to adapt the device described for use in the principal control.

I claim:

1. Device for the control of an aircraft jet engine having a combustion chamber and fuel injectors; a first pump rotationally driven by the jet engine and supplying a hydraulic liquid to a volumetric hydraulic motor coupled to a volumetric fuel pump, said first pump being self-regulating, having a regulator which varies the flow of said pump so as to maintain a constant charging pressure, the fuel pump suppling said fuel injectors by means of a flow regulator.

2. Device according to claim 1, characterized in that the volumetric hydraulic motor and the volumetric fuel pump each have a constant cylinder capacity whereby the pressure of the fuel moved by said pump is constant and whereby the flow regulator does not require a control valve.

3. Device according to claim 1 or claim 2, characterized in that a charging conduit for the hydraulic pump is equipped with a branch connected to a circuit for supplying the service appliances of the aircraft upon which the jet engine is mounted.

4. Device according to one of claims 1 or 2, characterized in that it includes a set of emergency controls in which the volumetric pump coupled with the hydraulic motor is separate from the usual pump supplying the principal control for the aircraft, with a selectively operable slide for the commutation of the supply circuit of the injectors either to fuel supplied by the principal controls or to fuel supplied by the emergency fuel pump, the conduit carrying the principal fuel then being connected with a return conduit.

5. Device according to claim 4, characterized in that the supply circuit of the injectors from the emergency fuel pump is equipped with means to supply fuel under pressure to a control device regulating the cross section of ejection of a jet nozzle of the engine so as to keep said ejection section at a maximum or a minimum, as desired.

* * * * *